United States Patent [19]

Kauffman et al.

[11] 4,069,173

[45] Jan. 17, 1978

[54] FIRE RETARDANT POLYISOCYANURATE AND POLYURETHANE FOAMS HAVING REDUCED SMOKE LEVELS AND METHOD FOR PRODUCING SAME

[75] Inventors: William J. Kauffman, Manheim; Edwin J. Quinn, Lancaster, both of Pa.

[73] Assignee: Armstrong Cork Company, Lancaster, Pa.

[21] Appl. No.: 679,688

[22] Filed: Apr. 23, 1976

[51] Int. Cl.$^2$ .................. C08G 18/28; C08K 5/09
[52] U.S. Cl. .................. 260/2.5 AJ; 260/2.5 AM; 260/2.5 AW; 260/45.85 T; 260/DIG. 24
[58] Field of Search .................. 260/2.5 AJ, 2.5 AM, 260/45.85 T, 2.5 BH, 2.5 AW

[56] References Cited

U.S. PATENT DOCUMENTS

| | | | |
|---|---|---|---|
| 3,637,542 | 1/1972 | Doerge et al. | 260/2.5 AJ |
| 3,637,543 | 1/1972 | Kus et al. | 260/2.5 AJ |
| 3,639,307 | 2/1972 | Doerge et al. | 260/2.5 AJ |
| 3,647,724 | 3/1972 | Doerge et al. | 260/2.5 AJ |
| 3,746,664 | 7/1973 | Doerge et al. | 260/2.5 AJ |

*Primary Examiner*—Donald E. Czaja
*Assistant Examiner*—H. H. Fletcher
*Attorney, Agent, or Firm*—Richard J. Hammond

[57] ABSTRACT

This invention relates to fire-retardant polyisocyanurate and polyurethane foams having reduced smoke levels when burned and to methods for producing such foams. The foams are produced by incorporating into the polyisocyanurate or polyurethane a. polycarboxylic cycloaliphatic acids having 3 non-adjacent carboxylic acid groups or any configuration with more than 3 carboxylic acid groups up to and including acids containing one carboxylic acid group per carbon atom, b. polycarboxylic heterocycloaliphatic acids having 3 non-adjacent carboxylic acid groups or any configuration with more than 3 carboxylic acid groups up to and including acids containing one carboxylic acid group per carbon atom, c. polycarboxylic aromatic acids having 3 non-adjacent carboxylic acid groups or any configuration with more than 3 carboxylic acid groups up to and including acids containing one carboxylic acid group per carbon atom, d. polycarboxylic naphthalenic acids having 3 non-adjacent carboxylic acid groups or any configuration with more than 3 carboxylic acid groups up to and including acids containing one carboxylic acid group per n-2 carbon atoms, where n = total number of carbon atoms in the ring system.

Some anhydride groups may also be present in the composition.

9 Claims, No Drawings

FIRE RETARDANT POLYISOCYANURATE AND POLYURETHANE FOAMS HAVING REDUCED SMOKE LEVELS AND METHOD FOR PRODUCING SAME

BACKGROUND OF THE INVENTION

Much attention has recently been devoted to producing flame retardant foam plastics since these materials have found their way into widespread use in homes, offices, autos, etc. where the reduction of fire hazard is an important objective. An objective of almost equal importance is to reduce the amount of smoke produced when foam materials burn since a very serious threat to personal safety is posed by the effects of smoke in obscuring the vision of and asphyxiating persons exposed to the smoke.

Various chemical additives have been incorporated in such foams in an effort to reduce smoke. In particular, certain aliphatic acids, such as fumaric acid, have been shown to reduce smoke in certain polymer foams, such as polyisocyanurates and polyurethanes. However, the compounds of this invention are much more efficient smoke reductants in similar foam formulations at the same acid-equivalent concentration even though their empirical formulas are the same or very similar to the aliphatic acids.

DESCRIPTION OF THE INVENTION

A. Summary

A reduction in smoke evolved from polyisocyanurate and polyurethane foams when such foams are burned is achieved by adding to the foam certain polycarboxylic cycloaliphatic acids, polycarboxylic heterocycloaliphatic acids, polycarboxylic aromatic acids, and/or polycarboxylic naphthalenic acids. Some anhydride groups of the various acids may also be present.

B. Detailed Description

The benefits of the invention may be realized in connection with conventional polyisocyanurate and polyurethane foams. For example, foams of the type described in U.S. Pat. No. 3,637,543 are suitable.

Particularly useful foam materials may be prepared by trimerizing di, tri, and polymeric isocyanates in the presence of small amounts of high-molecular-weight, flexible-type diols, with or without certain fire-retardant additives, or other materials that cause, aid, and/or stabilize cell formation. More specifically, aromatic diisocyanates may be trimerized with the acid of a reactive-type basic amine catalyst in the presence of a long-chain diol (MW–about 3000 to 7000) (NCO/OH ratio may vary from 1.0/0.05 to 1.0/0.50). In addition, the reaction mixture may also contain a urethane catalyst system (e.g., tin compound plus amine). The reaction is caused to occur in the presence of suitable foam-formation materials, including, e.g., a silicone surfactant or other type surface-active agents and, e.g., a Freon-type blowing agent. Also, certain fire retardant agents are used, if the polyol is not suitably fire retardant, and normally these contain phosphorous in some form. An example of a useful basic foam composition comprises a liquid aromatic diisocyanate, a long-chain aliphatic diol, amine and tin catalysts, a silicone surfactant, a suitable blowing agent, and a phosphorus containing fire retardant agent. The above-described smoke reducing acids are added to such compositions to produce novel foams which evolve lower amounts of smoke when burned.

The acids may be incorporated during the foaming step or after the foam is formed.

The polycarboxylic acid compounds of the invention may be used in any amount provided that the amount is large enough to contribute a reduction in smoke, but not so large as to change the basic character or utility of the polyisocyanurate or polyurethane foam product. Generally from about 5 to about 40 percent by weight and preferably from about 10 to about 20 percent by weight of the total composition is employed.

The acids of the invention have the following general formulas:

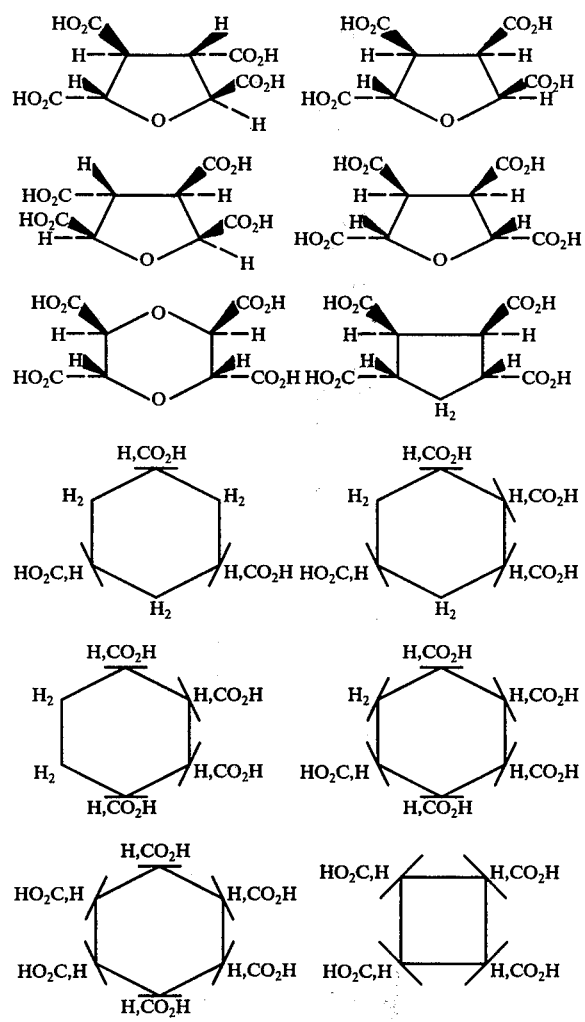

The preferred acids have three or more acid groups located structurally so that they do not readily form five membered acid anhydride rings. Heterocycloaliphatic polytricarboxylic acids are highly effective with 2,3,4,5-tetrahydrofuran-tetracarboxylic acid, being a particularly preferred acid compound.

The polycarboxylic aromatic acids of the invention have the following general formulas:

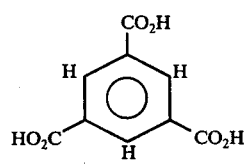

-continued

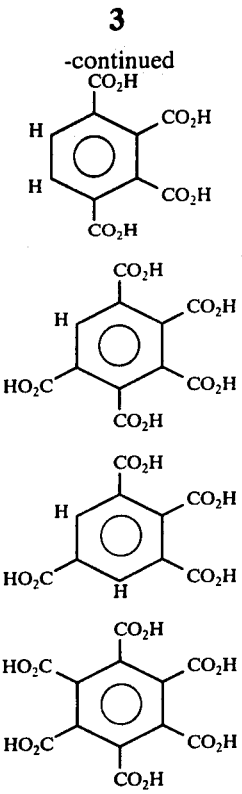

and include the naphthalenic system:

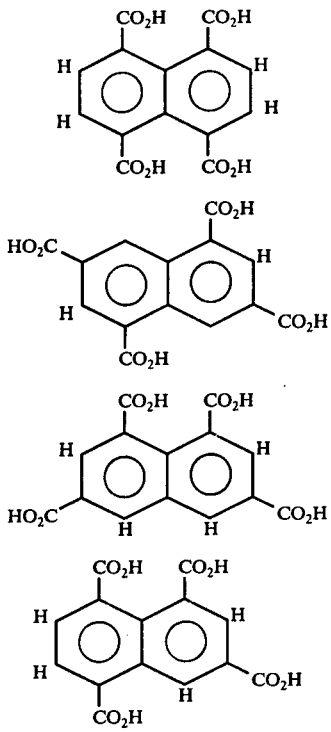

Polycarboxylic aromatic acids having three or more acid groups per ring, with the exception of 1,2,4,5-benzene tetracarboxylic acid, are useful in the invention. Trimesic, and mellitic (1,2,3,4,5,6-benzene hexacarboxylic) acids have been found to be particularly effective.

The invention will be more fully appreciated in light of the following examples in which all parts and percentages are by weight unless otherwise indicated.

EXAMPLE 1

| Typical Foam Formulation | Parts by Weight |
|---|---|
| Polyol - Multranol-7100 (High MW triol-hydroxyl No. 49, equiv. wt. -1145 | 31.7 |
| Acid Additive | Varied |
| Surfactant - Tegostab B3640 (fire retardant silicone surfactant) | 0.8 |
| Catalysts | |
| Dabco LV-33 (triethylene diamine) | 0.2 |
| T-9 (stannous octoate) | 0.2 |
| N,N',N'-tris (dimethyl aminopropyl) hexahydro-s-triazine | 0.8 |
| Blowing Agent - UCON-113 - Freon (fluorocarbon BP 113F) | 10.0 |
| Isocyanate - Upjohn Isonate 143L (liquid methylene diphenyl isocyanate) | 40.0 |
| (NCO/OH) = | 1.0/0.1 |

The above foam was prepared using a standard one-shot foaming technique followed by post curing the foam for 10 minutes at 80° C. Foam samples were cut and tested according to the standard procedure established in ASTM D-2843-70, commonly called the Rohm & Haas XP2 Smoke Chamber Test.

Experimental results were obtained for a series of foams containing various acids. The smoke value per gram (SV/g) was obtained by dividing the Rohm & Haas smoke result by the sample weight of the 1inch cube that was tested. The acid equivalent (AE) for the acids employed was calculated by multiplying the number of acid groups in the molecule times the weight of the acid used and dividing the result by the compound molecular weight. When the acid equivalent is in turn divided by the total weight of the foam mix, excluding the blowing-agent weight since it is lost during foaming and aging, the acid equivalent per gram of foam weight (AE/g) is obtained. The smoke value per acid equivalent (SV/AE) is calculated by dividing the smoke value per gram by the acid equivalent per gram of foam weight. The smoke-reduction efficiency factor (SF) is determined by normalizing the smoke value per acid equivalent to that of fumaric acid. Using the above method, the following results were obtained.

EXAMPLE 2

| | Smoke Results Obtained Using 10g Acid Additive in the Standard Foam Formulation of Example 1 | | | | |
|---|---|---|---|---|---|
| Acid Employed | Rohm & Haas SV | SV/g | AE/g | SV/AE | SF |
| 2,3,4,5-tetrahydro-furan tetracar- | 12 | 10 | 0.001926 | 5192 | 2.53 |

Smoke Results Obtained Using 10g Acid Additive in the Standard Foam Formulation of Example 1

| Acid Employed | Rohm & Haas SV | SV/g | AE/g | SV/AE | SF |
|---|---|---|---|---|---|
| boxylic acid | | | | | |
| Fumaric acid | 32 | 27 | 0.002059 | 13113 | 1.00 |
| Maleic acid (couldn't foam, deactivated catalyst) | | | 0.002059 | — | — |
| Itaconic acid | 89 | 66 | 0.001836 | 35948 | 0.36 |
| Adipic acid | 92 | 86 | 0.001636 | 52567 | 0.25 |
| 1,2,3-propane tri-carboxylic acid | 68 | 63 | 0.002024 | 31126 | 0.42 |
| Citric acid | 75 | 58 | 0.001865 | 31099 | 0.42 |
| Aconitic acid | 62 | 41 | 0.002059 | 19913 | 0.66 |
| Nitrilotriacetic acid | 40 | 29 | 0.001876 | 15458 | 0.85 |
| Ethylenediamine tetracetic acid | 57 | 42 | 0.001636 | 25672 | 0.51 |

As demonstrated by these results, 2,3,4,5-tetrahydrofurantetracarboxylic acid is unexpectedly more than 2½ times as effective as a smoke reductant in the same foam system than the commonly used fumaric or adipic acids.

EXAMPLE 3

When the standard foam formulation of Example 1 contains only 7.9g polyol (NCO/OH = 1.0/0.025) and the corresponding foam is prepared, it forms a rigid structure and is fire retardant. A comparison of the results for 2,3,4,5-tetrahydrofuran-tetracarboxylic acid and fumaric acid as smoke reductants in this type formulation is given below:

Smoke Results Obtained Using 10g Acid Additive in the Standard Foam Formulation, but Using only 7.9 g Polyol (NCO/OH = 1.0/0.025)

| Acid Employed | Rohm & Haas SV | SV/g | AE/g | SV/AE | SF |
|---|---|---|---|---|---|
| None | 25 | 25 | — | — | — |
| Fumaric acid | 39 | 39 | .002059 | 18941 | 1.00 |
| Tetrahydrofuran tetracarboxylic acid | 9 | 9 | .001926 | 4674 | 4.05 |

The above results again show the superiority of tetrahydrofuran-tetracarboxylic acid over that of fumaric acid and in this case show the use of the material in a fire-retardant, rigid-foam system.

EXAMPLE 4

Polycarboxylic aromatic acids were used in the basic foam formation of Example 1 in amounts as shown in the following table. Comparison with other acids is also set forth in the table.

Smoke Results Obtained Using 10 g Acid Additive in the Standard Foam Formulation of Example 1

| Acid Employed | Rohm & Haas SV | SV/g | AE/g | SV/AE | SF |
|---|---|---|---|---|---|
| Mellitic Acid | 17 | 11 | 0.00209 | 5281 | 1.78 |
| Trimesic Acid | 8 | 10 | 0.001706 | 5862 | 1.60 |
| Trimellitic Acid | 18 | 16 | 0.001706 | 9379 | 1.00 |
| o-Phthalic Acid | 81 | 86 | 0.001438 | 59805 | 0.16 |
| Isophthalic Acid | 25 | 16 | 0.001438 | 11127 | 0.84 |
| Terephthalic Acid | 43 | 31 | 0.001438 | 21558 | 0.44 |
| Pyromellitic | 46 | 87 | 0.001881 | 46252 | 0.20 |
| 1,4,5,8-Naphthalene tetracarboxylic acid | 15 | 13 | 0.001571 | 8275 | 1.13 |
| Aurin Acid | 82 | 78 | 0.000873 | 89347 | 0.10 |
| Benzoic acid - couldn't foam | | | | | |

As demonstrated by these results, the trimesic and mellitic acids are unexpectedly at least 1½ times more efficient smoke reductants in the system listed than the commonly used trimellitic acid. The 1,4,5,8-naphthalenic tetracarboxylic acid of the invention also shows results superior to other acids.

EXAMPLE 5

When the standard foam formulation listed in Example 3 contains only 7.9 g polyol (NCO/OH - 1.0/0.025) and the corresponding foam is prepared, it forms a rigid structure and is fire retardant. A comparison of the results for trimellitic and trimesic acids as smoke reductants in this type formulation is given in the following table:

Smoke Results Obtained Using 10g Acid Additive in the Standard Foam Formulation, but Using Only 7.9g Polyol

| Acid Employed | Rohm & Haas SV | SV/g | AE/g | SV/AE | SF |
|---|---|---|---|---|---|
| None | 25 | 55 | — | — | — |
| Trimellitic Acid | 22 | 32 | 0.002384 | 13423 | 1.00 |
| Trimesic Acid | 6 | 11 | 0.002384 | 4614 | 2.91 |

The above results again show the superiority of the trimesic acid over that of trimellitic acid and in this case show the use of the material in a fire-retardant rigid-foam system.

EXAMPLE 6

A rigid polyurethane foam was prepared from the following formulation:

| | | |
|---|---|---|
| RF - 230 | 100 | parts |
| UNCON -11B Catalyst | 35 | |
| Dabco LV33 | 2.75 | |
| Stannous Octoate | | |
| PFA-1200 | 2.0 | |

-continued

| AFPI | 100.0 |

In the above formulation RF-230 is a fire-retardant polyol based 4,4,4-trichloro-2,2-epoxybutane extended with propylene oxide and capped with ethylene oxide (Olin Corporation). AFPI is a polymeric aromatic isocyanate having a %NCO = 31.1, and an amine equivalent of 135.1, and PFA-1200 is a silicone surfactant (General Electric Corporation).

Smoke-evolution properties of foams were evaluated by using an Aminco-NBS Smoke Density Chamber (Model 4-5800, Aminco-NBS Smoke Density Chamber, American Instrument Co.), as described by Gross et al, "A Method of Measuring Smoke Density from Burning Materials", ASTM SPT-422 (1967). Samples were tested using the flaming and non-flaming test modes. This small scale test subjects a sample to the two general conditions which prevail in the majority of "real" fires and especially in tunnel tests. In the tests the maximum specific optical density Dm, corrected for soot deposits on the cell windows was measured. The average value of Dm(corr) using both the flaming and non-flaming modes was also calculated. An average Dm(corr) value of 450 as determined in the NBS Smoke Density Chamber has been adopted as a regulation value by the U.S. Department of Health, Education and Welfare, see HEW Publication No. (HRA) 74-4000 (1974). Generally, NBS smoke values of 450 or less are normally required in those fire or code regulations restricting smoke evolution.

The results of using trimesic acid in such a formulation are shown in the following table:

| Effect of Trimesic Acid in Rigid Polyurethane Foam | | | | |
|---|---|---|---|---|
| Trimesic Acid | | NBS Results | | |
| Parts (Per 100 Polyol) | Weight % | Flaming Dm(corr) | Nonflaming DM(corr) | Ave. Dm(corr) $\frac{F + N}{2}$ |
| 0 | 0 | 106 | 101 | 104 |
| 10 | 4.7 | 75 | 61 | 68 |
| 20 | 8.9 | 68 | 52 | 60 |
| 25 | 10.9 | 61 | 50 | 56 |
| 30 | 12.8 | 61 | 49 | 55 |
| 40 | 16.3 | 48 | 47 | 48 |

The above results demonstrate that trimesic acid is an effective smoke reductant in polyurethane foam.

The invention has been described with reference to certain illustrative examples, but is not limited thereto.

What is claimed is:

1. Polyisocyanurate and polyurethane foams characterized by reduced smoke levels when burned comprising a foam material selected from the group consisting of polyisocyanurate and polyurethane foams, and an acid incorporated in said foam in an amount sufficient to reduce smoke levels of said foam when said foam is burned, said acid being selected from the group consisting of a. polycarboxylic cycloaliphatic acids having 3 non-adjacent carboxylic acid groups or any configuration with more than 3 carboxylic acid groups up to and including acids containing one carboxylic acid group per carbon atom, b. polycarboxylic heterocycloaliphatic acids having 3 non-adjacent carboxylic acid groups or any configuration with more than 3 carboxylic acid groups up to and including acids containing one carboxylic acid group per carbon atom, c. polycarboxylic naphthalenic acids having 3 non-adjacent carboxylic acid groups or any configuration with more than 3 carboxylic acid groups up to and including acids containing one carboxylic acid group per $n$-2 carbon atoms, where $n$ = total number of carbon atoms in the ring system, and d. mixtures of said acids.

2. The foam composition of claim 1 wherein said acid is present in an amount of from about 5 to about 40% by weight of said composition.

3. The foam composition of claim 1 wherein said acid is present in an amount of from about 10 to about 20% by weight of said composition.

4. The foam composition of claim 1 wherein said acid is 2,3,4,5-tetrahydrofuran-tetracarboxylic acid.

5. The foam composition of claim 1 wherein said acid is 1,4,5,8-naphthalene tetracarboxylic acid.

6. The foam composition of claim 2 wherein said acid is 2,3,4,5-tetrahydrofuran-tetracarboxylic acid.

7. The foam composition of claim 2 wherein said acid is 1,4,5,8-naphthalene tetracarboxylic acid.

8. The foam composition of claim 3 wherein said acid is 2,3,4,5-tetrahydrofuran-tetracarboxylic acid.

9. The foam composition of claim 3 wherein said acid is 1,4,5,8-naphthalene tetracarboxylic acid.

* * * * *